Figure 1:
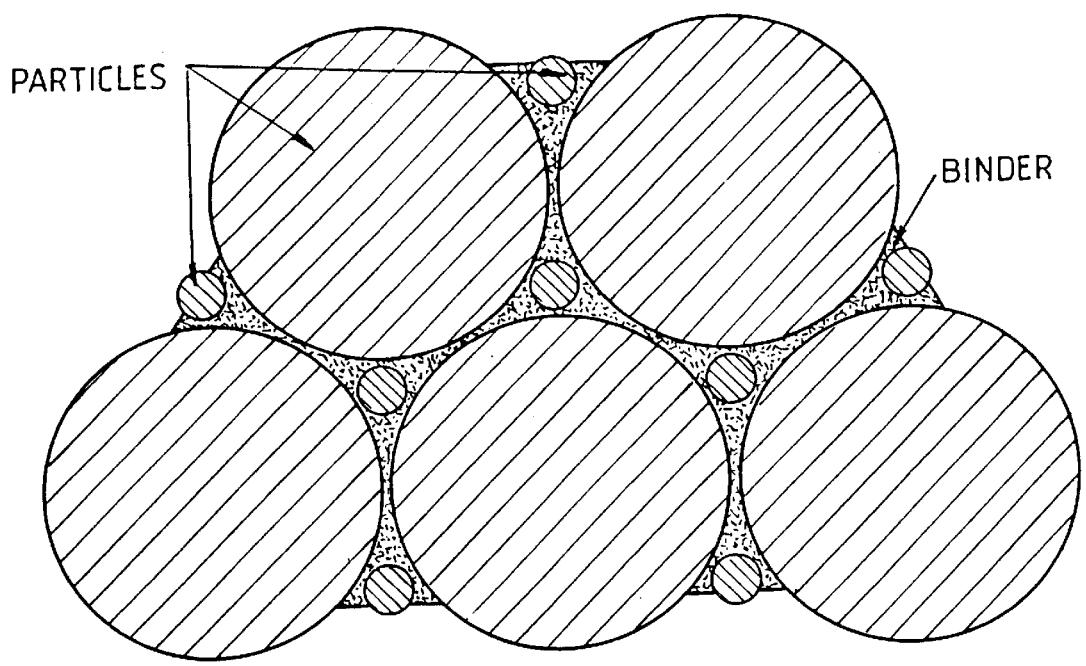

United States Patent [19]

Shaw et al.

[11] Patent Number: 5,886,092

[45] Date of Patent: Mar. 23, 1999

[54] BINDER SYSTEMS

[75] Inventors: Raymond Walter Shaw, New Gisborne; Drago Dragutin Juric, Bulleen; Gavan Joseph Stray, North Dandenoga, all of Australia

[73] Assignee: Comalco Aluminuim Limited, Melbourne, Australia

[21] Appl. No.: 870,384

[22] Filed: Jun. 6, 1997

Related U.S. Application Data

[63] Continuation of Ser. No. 549,765, filed as PCT/AU94/00338 Jun. 21, 1994 published as WO95/00458 May 1, 1995, abandoned.

[30] Foreign Application Priority Data

Jun. 21, 1993 [AU] Australia ................................ PL9522

[51] Int. Cl.⁶ ............................ C08L 71/12; C08L 71/14; C08L 3/04; C08K 3/04
[52] U.S. Cl. ........................... 524/611; 524/495; 524/496; 524/540; 524/541; 524/542; 523/200; 156/155; 264/29.1; 264/105
[58] Field of Search ................................. 524/611, 495, 524/496, 540, 541, 542; 523/200; 156/155; 264/29.1, 105

[56] References Cited

U.S. PATENT DOCUMENTS

| | | | |
|---|---|---|---|
| 4,481,052 | 11/1984 | Buchta et al. | 156/155 |
| 4,775,455 | 10/1988 | Chandramouli et al. | 204/294 |
| 4,816,511 | 3/1989 | Castonguay et al. | 524/496 |
| 4,897,170 | 1/1990 | Chandramouli | 204/294 |
| 4,939,188 | 7/1990 | Gerber | 523/146 |

*Primary Examiner*—Marion McCamish
*Assistant Examiner*—John J. Guarriello
*Attorney, Agent, or Firm*—Nikaido Marmelstein Murray & Oram LLP

[57] ABSTRACT

Disclosed are methods for preparing carbon-containing materials resistant to alkali metal disruption, and compositions suitable for the preparation of carbon-containing materials resistant to alkali metal disruption. A composition in accordance with the invention comprises a mixture of (a) a binder phase having a viscosity of less than 10 Pascal seconds and a char yield in excess of 20% upon heating to a temperature of 800°–1200° C., and comprising at least one polymerizable resin and (b) particles of a solid material which is thermally stable at a temperature of 800°–1200° C., the particles having a granulometry wherein void spaces between the particles have a size of less than 20 μm in diameter and the particles are coated with a layer of binder phase having a thickness of less than 2 μm. When the composition is carbonized by heating to a temperature of 800°–1200° C., the composition forms a carbon-containing material resistant to alkali metal disruption.

71 Claims, 3 Drawing Sheets

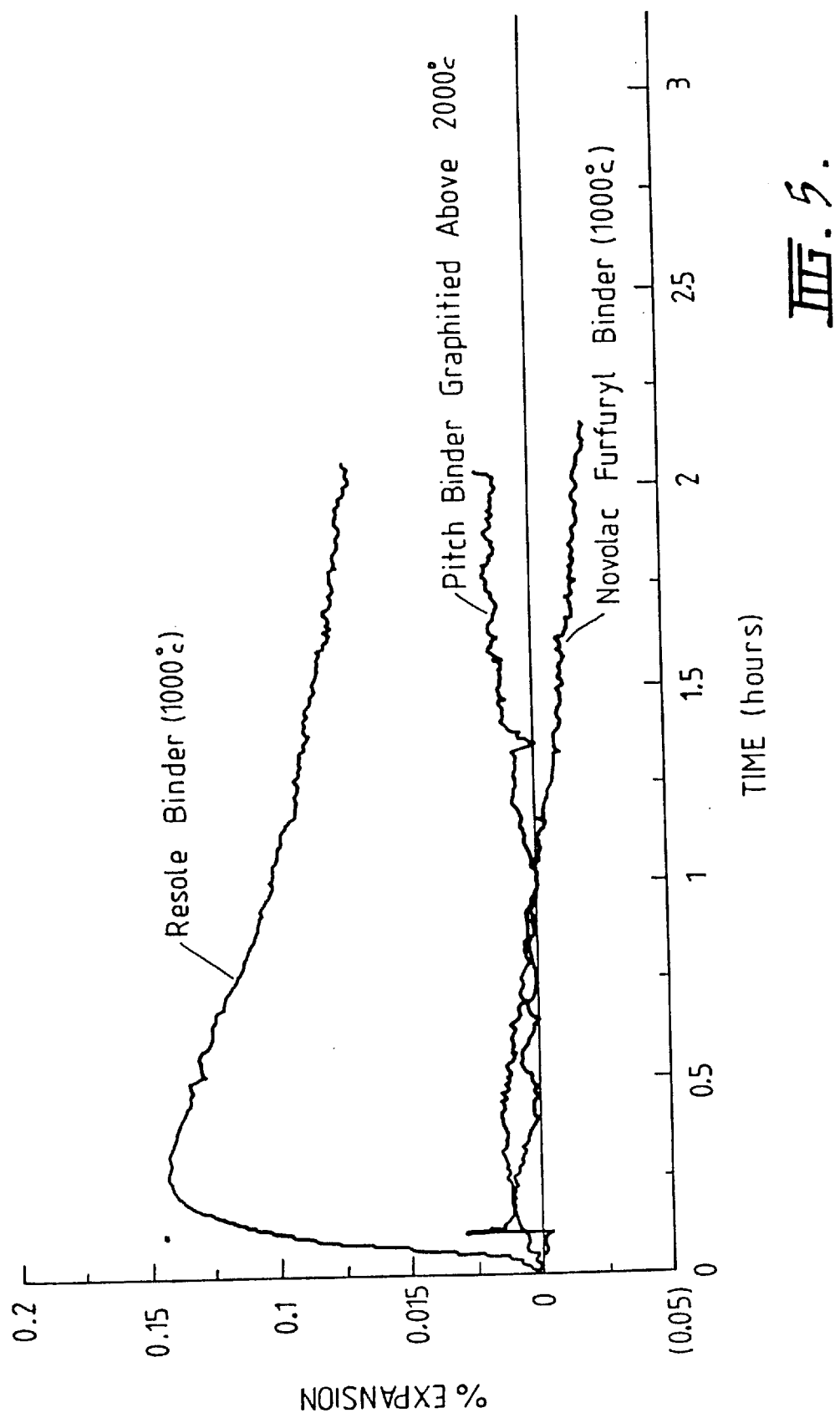

BINDER SYSTEMS

This application is a continuation of application Ser. No. 08/549,765, filed Nov. 30, 1995, now abandoned, which is a national stage entry of PCT/AU94/00338, filed Jun. 21, 1994, published as WO95/00458 Jan. 5, 1995.

The present invention relates to resin-based systems that are suitable for use in the preparation of carbon-containing materials, and to carbon-containing materials produced therefrom. The resin-based system and the carbon-containing materials produced therefrom are particularly suitable for use in and as cathodes and refractories in electrolytic cells used in the production of aluminium and the invention will hereinafter be described with reference to its use in electrolytic cells used in the production of aluminium. However, it is to be understood that the invention is not to be considered to be restricted to this use alone.

Aluminium metal is produced by the electrolysis of a solution of alumina ($Al_2O_3$) in molten cryolite ($Na_3AlF_6$) to cause the electrodeposition of molten aluminium at the cathode. Aluminium smelting cells are conventionally operated at temperatures in the range of 900° to 1000° C. and the bath of molten electrolyte represents a hot, aggressive and corrosive environment.

Aluminium smelting cells are generally constructed from a steel shell lined with refractory material. Carbon cathodes having collector bars embedded therein are placed on the refractory lining. In use of the cell, consumable anodes are positioned above the cathode and the space therebetween is filled with molten bath and molten aluminium metal. The anodes are easily removed from the cell and are generally replaced every 2–4 weeks. The cathode structure, however, forms the bottom part of an operating cell and it is not possible to replace part of the cathode structure during cell operation. Accordingly, the cathode structure must be designed to last for the expected operational life of the cell, which can range from 3 to 10 years. Indeed, failure in the cathode structure is the cause of many failures of aluminium smelting cells. Cathode failure necessitates shutdown and refit of the cell.

Cathode structures must meet several requirements in order to be suitable for use in aluminium smelting cells. In particular, the cathode must be electrically conductive, to allow the electrodeposition of aluminium to proceeds. The cathode must be physically strong to resist abrasion by the bath. Furthermore, the cathode material must be resistant to attack by the bath. Smelting cell baths have a high sodium activity and it is believed that attack by sodium is one of the major contributing factors to cathode disruption and failure.

Sodium is known to be capable of attacking and disrupting carbonaceous materials due to absorption and the formation of intercalation compounds which causes the carbon to swell and crack. The susceptibility of carbonaceous material to disruption by alkali metals is believed to be related to its ionisation work energy function or Fermi level. Low order, amorphous carbons have low Fermi levels which favour electron transfer from alkali metals and incorporation of these alkali metals into their structure. High order carbons such as graphite have a high Fermi level and are significantly less reactive to alkali metals.

Almost without exception, the cathode structures are produced from carbonaceous materials. To prepare a cathode block, particulate carbonaceous material (usually graphite and/or anthracite) is mixed with a pitch binder, shaped, and baked to a temperature of from 1200° C. to over 2000° C. The lower temperature baking (1200–1400C) gives a product which takes up considerable sodium and has a moderate swelling index (typically 0.4–1.0%) but which can be used in aluminium cells provided they have an appropriate design to allow for this expansion. The higher temperature baking produces a soft, graphitic type carbon which shows good resistance to attack by sodium and can have swelling indexes of less than 0.1%. For use in more complex duties such as preparing a wettable refractory hard material/graphite composite for use in advanced smelting cells the higher temperature baking (>2000C) to give this graphitic structure has been found to be necessary. This raises the fermi level to make the carbon resistant to alkali metals.

Pitch bonded systems also have disadvantages during the actual baking cycle as the pitch binder is liquid throughout the temperature range of up to 500° C. This can lead to slumping and other dimensional instability during baking of the cathode, which frequently leads to the requirement of machining the cathode in order to achieve the desired shape. This increases manufacturing costs as these temperatures require large electrical energy inputs to maintain.

Pitch-bonded cathodes have porosity ranging from over 20% to over 30%, due to the physical changes that occur during baking. If high density cathodes are required, the initial baked material is re-impregnated with pitch and re-baked. Pitch-bonded cathodes also have open porosity which may lead to easier infiltration by bath materials and to oxidation of components in the case of exposure to oxidising atmospheres. This is a particular problem where oxygen unstable materials such as refractory hard materials are incorporated in the cathode and where high temperature baking for extended time periods is needed. This also adds to the complexity and cost of the system.

One possible alternative to pitch-bonded carbonaceous aggregates for use as cathodes is to use a resin bonded system. However, conventional wisdom has it that such resin-bonded systems, on pyrolysis, forms a binder carbon of hard, cross-linked structure which produces an amorphous carbon. These amorphous carbons, also known as polymeric carbons, have a low Fermi level and are unstable to alkali metals such as sodium and can be disrupted by the formation of sodium intercalation compounds. Practice has borne out this conventional wisdom and resin-based carbon materials are not used as cathodes in aluminium smelting cells.

Several different types of resin based glues are used to glue conventional cathodes blocks in cells, but the level of high temperature bonding achieved is uncertain. In this use, layers of glue having a thickness of 1–2 mm are applied to the cathodes to join each block to the adjacent blocks. The cathode blocks are sufficiently porous to allow impregnation by the glue and good bonding is achieved in the cured state to allow cell construction and installation prior to start-up of the cell. During baking, thermal expansion pushes the blocks together, putting the joints under compression, which reduces or eliminates the bonding requirements on the glue. The glue has little structural role under these conditions but is important in filling the gap between cathodes to prevent leakage. The sodium resistance (or lack thereof) of the glue is not thought to be an issue due to the compressive forces that exist between cathode blocks as a result of thermal expansion at cell operating temperatures. Any partial disruption or expansion of the glue layer should not prevent it acting as a seal for the joint. The literature relating to such glues makes no reference to sodium resistance, nor to the types of glues used.

U.S. Pat. No. 4,479,913 in the name of Akerberg et. al. discloses a method and composition for joining carbon blocks together. The carbon blocks to be joined are typically cathodes used in aluminium electrolysis cells. The binder composition includes calcined anthracite, a resinous binder, monomeric furfuryl alcohol and a catalyst. The resinous material is a furan resin, a phenolic resin such as novolac, resole and bisphenol A, resorcinol coal tar or other resinous material which may be carbonised to greater than 40% carbon content. The catalyst used comprises a relatively weak acid or a chloride salt selected from zinc chloride, ammonium chloride or ferric chloride.

In use, the composition is rammed into the spaces between adjoining carbon blocks. It is stated that the ramming pressure on the mix forces furfuryl alcohol out of the mix with the aggregate and resin. The furfuryl alcohol then penetrates the peripheries of the carbon blocks. Upon heating, the furfuryl alcohol polymerises and, when heated to temperatures near 1000° C., the furfuryl alcohol polymer and unpolymerised furfuryl alcohol, both within the carbon blocks and within the spaces between adjacent carbon blocks, carbonises, leaving an additional carbon network within both the carbon block and the ramming mix. The carbon network within the carbon block is integrally linked with the carbon network of carbonised binder and monomer at the interface of the carbon block and aggregate mix to form a strong carbon-carbon bond between the carbon block and the aggregate mix.

The composition described in Akerberg et. al. will result in the formation of an amorphous or hard carbon upon baking or pyrolysis. No graphitic structure will be formed. Akerberg et. al. is concerned with obtaining a strong, rigid bond between adjacent carbon blocks. This is achieved by baking the binder composition to form a glassy carbon, it being well known that amorphous carbons are stronger than graphitic carbons. Although the amorphous carbon formed upon pyrolysis of the composition of Akerberg et. al. would be susceptible to disruption by sodium, disruption of this layer by sodium is not critical structurally and accordingly sodium resistance is not a requirement for the carbon obtained by pyrolysis of the composition of Akerberg et. al., for the reasons given earlier.

U.S. Pat. No. 4,348,343, also in the name of Akerberg et. al. and assigned to the Quaker Oats Company, describes a method and a composition for forming a dry free-flowing particulate solid which utilises a binder system for bonding particles of carbon, sand or other solid particulate materials. The binder consists of furfural and a novolac resin mixture. This mixture is then mixed with a particulate material having a small amount of a liquid amine dispersed thereon. Mixing is continued until the entire mass breaks into a free-flowing particulate material. The resulting particulate material may be shaped, extruded or compression moulded to a desired shape and connected to an integral mass by warmth or compression.

In order to achieve the objectives of U.S. Pat. No. 4,348,343, triethylenetetramine must be used as the amine catalyst. Examples given in the patent that used hexamethylenetetramine or triethanolamine did not achieve the desires result.

Example III of U.S. Pat. No. 4,348,343 showed the production of a carbon crucible by carbonising at 800° C. under a reducing atmosphere. Although not mentioned in the patent, a hard, amorphous carbon is likely to have been formed.

This patent is concerned only with the physical nature of the powder formed with no attempt at providing an improved carbon structure for chemical resistance. Accordingly, although a carbon structure may be formed on baking, this would result in the formation of a typical hard, amorphous carbon.

Several earlier references have disclosed that resin based systems could be pyrolysed to form graphitic carbons. However, without exception, all of these references required heating to temperatures in excess of 1600° C. to achieve a graphitic carbon. These references required thin layers of polymers to be placed on a surface. Upon pyrolysis, thin layers of graphite carbon were formed, which thin layers would have little or no practical application. The mechanism of formation and possible means of utilising systems of this type in producing useful objects was not disclosed.

Hungarian Patent Application No. 185,496 by Tatabanyai Aluminiumkoho describes a binder for producing artificial carbons. The binder includes a furfuryl alcohol resin (produced by mixing furfuryl alcohol with a phosphoric acid catalyst) mixed with $B_2O_3$ and/or boric acid. This binder system is used as a binder for, inter alia, binding graphite particles together to form shaped articles. Boron oxide or boric acid reacts with the furfuryl alcohol to form furfuryl borate. Under the effect of heat, furfuryl alcohol and furfuryl borate undergo polymerisation in the presence of the acid catalyst. According to the patent, the large organic molecules are cracked under the effect of higher temperatures, while $B_4C$ and pyrocarbon are formed, which represents a strong bond between the carbon and graphite particles used as a filler. This clearly indicates that the pyrocarbon formed by pyrolysis of the resin is not graphite.

Resin based glues have also been proposed as binders for composite materials containing refractory hard materials (RHM's), which composite materials may be suitable for use in aluminium smelting cells. For example, a suite of patents assigned to Martin Marietta Corporation or Commonwealth Aluminum Corp., including U.S. Pat. Nos. 4,466,996, 4,466,996, 4,526,911, 4,544,469, 4,602,990 and 4,624,766, discloses aluminium wettable composites made from an RHM, a thermosetting binder, a mix liquid, a carbonaceous filler and a carbonaceous additive. The composition, when carbonised (baked) produces a layer comprising the RHM in a carbonaceous matrix bonded by amorphous carbon. This is clearly a non-graphitic carbon. The composition is a wet, trowellable mixture, which requires substantial levels of binder and solvent. No attempt was made to control the particle granulometry and the amount and viscosity of the binder to give a thin binder layer and minimise the filling of void spaces. The composites described in these patents are limited to thicknesses of less than 2 cm. These materials have not been commercially implemented and there are doubts about their long term survival under use conditions. The composites also contain significant quantities of RHM's.

A number of other workers have patented the use of resin binders for electrodes in aluminium smelting. These have largely been used for anodes for which chemical resistance is less significant as they are not subject to high alkali metal activities and are consumed over a relatively short time period. This is typically less than 20 days. None of these patents cite improved or unexpected alkali metal resistance behaviour or rely on controlling the binder film thickness and/or the incorporation of hetero atoms into the system to modify the structure.

In a first aspect, the present invention provides a composition suitable for the preparation of carbon-containing material, said composition comprising a binder phase comprising at least one polymerisable resin and optionally one or more components selected from at least one polymerisation promoter agent and at least one solvent particles of solid material said solid particles being wetted by said binder phase one or more physical properties of said composition being such that thorough mixing of said particles and said binder phase causes said particles to become coated with a thin layer of said binder phase, said binder phase having a char yield in excess of 20% upon heating to a temperature in the range of 800°–1200° C.

said composition characterised in that a carbon-containing material resistant to disruption by alkali metals is formed when said composition is carbonised by heating to a temperature in the range of 800° C.–1200° C. Preferably, the one or more of the physical properties of the composition that enable thorough mixing of the particles and binder phase to cause the particles to become coated with a thin layer of the binder phase include the relative amounts of said particles and said binder phase, the viscosity of the binder phase and the granulometry of the particles.

Throughout this specification, the term "polymerisation promoter" is used to denote a species that acts to promote polymerisation of the polymerisable resin. The polymerisation promoter may simply act as a catalyst for the polymerisation reaction or it may take part in the polymerisation reaction as a reactant, thereby becoming at least partially incorporated into the polymer so produced.

Throughout this specification, "granulometry" of the particles refers to the particle size distribution and the distribution of particle shapes of the solid particles.

For applications in alumina smelting, sufficient resistance to alkali metal disruption is obtained when a test specimen is subjected to a standard Rapaport test in which the specimen expands less than 1% and no significant macroscopic cracks that will disrupt the structure are formed and this general test is used to denote alkali metal resistance throughout this specification. The Rapaport swelling test is described in an article by E. W. Dewing, Trans. Met. Soc. AIME, Vol 227, Dec. (1963), pp 1328–1333.

The composition of the present invention is a resin-based system that is able to be used to produce a carbon-containing material that is resistant to disruption by alkali metals following baking at temperatures of between 800°–1200° C., preferably 900°–1100° C. Conventional wisdom has thought that baking resin-based systems at such temperatures would produce hard amorphous carbons that have low Fermi levels and which would be easily disrupted by alkali metals. However, the present inventors have now discovered that by carefully controlling (i) the relative ratio of solid particles to binder system, (ii) the viscosity of the binder phase at the mixing temperature, (iii) the granulometry of the solid particles, and (iv) the surface chemistry of the solid particles and the binder chemistry to give wetting of the particles thorough mixing of the solid particles, and the binder system will cause the particles to become coated with a thin layer of the binder phase. The thickness of this thin layer of binder phase is typically less than 2 $\mu$m, preferably less than 1 $\mu$m and more preferably less than 0.5 $\mu$m.

If the above-mentioned thin layer of an appropriate binder around each particle is obtained, curing the mixture and carbonising the mixture at temperatures of 800°–1200° C., preferably 900°–1100° C. will cause carbonisation of the binder phase to produce a carbon-containing material that is resistant to disruption by alkali metals, such as sodium. Accordingly, the composition of the present invention allows the preparation of alkali metal resistant products from a resin-based material by carbonisation at temperatures that are much lower than previously thought possible.

The solid particles used in the composition of the invention preferably have a granulometry that allows for close packing between the particles and avoids the formation of large voids between particles that would be filled by binder phase during mixing. The particles are preferably sized between 5 $\mu$m and 2000 $\mu$m and may comprise a bimodal or trimodal mixture, or even a controlled mixture of continuous size distribution in order to achieve the desired granulometry. Preferably, the voids between the particles are less than 20 $\mu$m in diameter, more preferably less than 15 $\mu$m in diameter and most preferably less than 5 $\mu$m in diameter. When the binder phase is mixed with the solid particles, some of the binder phase may fill the voids between the particles. The present inventors have postulated that part of the binder in the voids may not be fully resistant to alkali metals following carbonisation and this may account for the small degree of sodium intercalation found in some samples prepared in accordance with the invention. This generally does not present a problem provided the binder that holds the particles together is not disrupted and provided the amount of binder in the voids is small enough that part expansion due to sodium uptake by that carbon does not cause sufficient stress over the total system to disrupt it. Therefore, the size of the voids between particles should be minimised.

The particles may be of any solid material that is thermally stable at the temperatures used to carbonise the composition. Such solid material includes coke, anthracite, graphite, ceramic materials, refractory hard materials (e.g. the borides, nitrides and carbides of the group IV to VI transition metals) and possibly high melting point metals.

The surface of the particles can, if desired, be treated to improve wetting by the binder phase. Examples of such treatment include deliberate oxidation, washing in water or acid or addition of a chemical surfactant.

The choice of material for the solid particles depends upon the desired use of any article or artefact made from the composition. For example, if the composition is to be used to make cathodes for a conventional aluminium smelting cell, the solid particles may be of graphite or anthracite. Other solid particles may be used in different applications or to alter the properties of the final product. For example, if it is desired to produce a cathode for an aluminium electrolysis cell that is wettable by molten aluminium (as is desired in a drained cathode cell), refractory hard materials, such as $TiB_2$, may be incorporated into the composition to provide an aluminium wettable surface in the final product. Other solid particles could be considered to improve oxidation resistance, metals to improve mechanical properties or ceramic oxides to give refractory properties.

When fully mixed in the green state, the composition of the present invention preferably has a consistency that is similar to that of a cooking pastry. The consistency may vary depending upon the relative amounts of binder phase and solid particles used in the composition. Generally, the fully mixed composition in the green state should exhibit some cohesiveness, for example, it should be possible to gently squeeze the fully mixed composition into a ball and have the ball stick together at this stage after the material is formed and prior to curing.

In instances where relatively large amounts of solvent(s) are used, which solvents volatilise or are otherwise removed from the mixed, green composition prior to curing, the fully mixed composition may be in the form of a wet paste upon initial mixing.

Without wishing to be bound by theory, it has been postulated that the resistance to disruption by alkali metals in carbonised material formed from the composition of the present invention is provided by the presence of graphitic or ordered carbon structures in the final carbonaceous product. It is believed that one or more of strain ordering of the polymer precursor plus strain ordering of the binder during pyrolysis/carbonisation to give a highly ordered structure, leads to increased Fermi level and improved alkali metal resistance. Furthermore, incorporation and retention of electron donor atoms into the carbon lattice formed from this thin binder phase film can further increase the Fermi level and the alkali metal resistance. Ordering may be promoted chemically through the control of curing reactions and formation of an ordered polymer precursor. Hence, carbons with a high Fermi level having high resistance to disruption by alkali metals can be produced at a surprisingly low temperature in the range of 800°–1200° C., more preferably 900°–1100° C.

There have been literature reports of graphite carbons being produced from polymer systems by special treatments using catalytic and/or stress graphitisation methods. These have been in research studies and have not been known to be used to prepare objects or artefacts. In this prior work, although some changes were seen at temperatures as low as 1000° C., graphitisation required heat treatment to temperatures above 1600° C., as with normal graphitisable precursors such as anthracite or pitch. These special polymer systems were reported to show anisotropy which is also seen in traditional graphitisable carbons at temperatures in the order of 1000° C. However, unless heated further to temperatures in excess of 1600° C., traditional graphitisable carbons such as anthracite have a low Fermi level and are susceptible to alkali metal attack and the polymer systems reported would also be expected to show similar behaviour.

It is further postulated that, in the present invention, the presence of a thin layer of binder phase which undergoes solid state pyrolysis around the solid particles is one of the pre-requisites for the formation of carbon having a high Fermi level through strain ordering. Again without wishing to be bound by theory, it is believed that a thin layer of binder phase around each particle allows in-layer tensile stress and cross-layer compressive stress to be formed during curing and/or pyrolysis, which stresses allow re-ordering of the structure to take place during pyrolysis to produce upon pyrolysis a carbon having a degree of structural order and hence a higher fermi level and alkali metal resistance than would be expected for the polymer system when cured in the absence of particles or in thicker layers as conventionally used. Without wishing to be bound by theory it is further postulated that the polymer structure of this thin layer of binder phase can be arranged such that it can undergo substantial dehydrogenation during pyrolysis without major disruption of the primary polymer backbone through selection of suitable precursors with polymers incorporating suitable hetero atoms such as nitrogen being particularly favoured. In such a thin layer as utilised in this invention the surface of the solid particles may also assist in the ordering provided it is of the correct composition to be in intimate contact and has active species present to influence the components of the binder system. Irrespective of the mechanism involved, tests by the inventors have shown that high Fermi level carbon (and hence, alkali metal resistant carbon) is not formed upon pyrolysis at around 1100° C. if no solid particles are present in the binder phase or if too much binder phase is present, which produces a mixture that may be described as a "pool" of binder phase having solid particles dispersed therein.

Borden in U.S. Pat. No. 4,775,455 cite the use of phenol formaldehyde novolac and phenol formaldehyde resoles to produce electrodes for use in aluminium production. They claim these materials give a suitable physical structure with better properties than pitch bound materials. No attempt is disclosed in the patent to control the thickness of the binder film or to promote any special properties of the binder carbon through selection of special resins. Indeed, no chemical resistance data is provided to judge their performance in terms of alkali metal attack which is the most critical factor in cathode applications. These cathodes are not known to be used commercially.

The two resins cited in the Borden patent normally form disordered amorphous carbons as they link through methylene bridges. Although they can use hexamine as a curing agent, the mechanisms do not lead to incorporation of nitrogen into the system at temperatures above 300° C. Also they do not react with the added liquid components added as plasticisers in the binder such as postulated in the system of the present invention. Furthermore, none of the other workers who use resin binders for electrodes in aluminium smelting cite improved or unexpected alkali metal resistance or rely on incorporation of hetero atoms into the system to modify the structure.

According to the present invention, in order to obtain the desired thin film of binder phase around the solid particles, it is necessary to match the granulometry of the solid particles with the properties of the binder phase. It is also necessary to have a correct ratio of solid to binder.

The surface of the particles must be wetted by the binder phase in the as-mixed (green) state and remain attached when polymerised (following curing) such that a cohesive structure is formed of reasonable strength and the polymer is spread over the particle surfaces to facilitate the thin layers, in the green state prior to curing.

The viscosity of the green binder phase must be sufficiently low to enable it to spread on the particle surfaces and be sufficiently thin to achieve the desired properties. The viscosity is obviously temperature dependent, but has a preferred value of less than 10 Pa.s at the temperature at which the green composite is formed (mixing temperature), with a preferred viscosity of less than 1.0 Pa.s being used and an especially preferred viscosity of from 0.1 to 0.5 Pa.s. The viscosity of the binder phase is determined in the absence of any very fine filler particles that may be added.

The viscosity values of the binder phase given above are determined by measuring the viscosity of the binder phase without any very fine filler particles present. If fine filler particles are present in the binder phase, the viscosity of the binder phase may increase to values above 10 pa.s and the binder phase will become a non-Newtonian fluid. Nevertheless, if the viscosity of the binder phase before the addition of very fine filler particles is less than 10 pa.s, the binder phase meets the viscosity requirements of the present invention.

The binder phase may also contain very fine particles, such as carbon black or carbon flour and viscosity modifiers such as silica as part of the volume. Such very fine particles (typically sized less than 1 µm, more preferably from 30–500 nm) become part of the binder phase and can further assist in stabilising the binder properties. These very fine particles are particularly beneficial in controlling the shrinkage properties of the binder film and lower the amount of volatiles released and porosity generated during curing and baking. They are not essential to forming the high Fermi level carbon but may be useful in increasing the degree of ordering the cases where low char yielding binders are used. They are used in similar applications in refractories and in anodes where pitch is the binder to improve physical properties.

The viscosity measurement can be made using any standard technique which provides an absolute measure of viscosity. The method used by the present inventors uses a "Couette" type rotational viscometer with a Bob and Cup geometry. Other suitable geometries include cone and plate, and parallel plate.

The binder phase and solid particles are preferably mixed such that the binder phase comprises 20–45% by volume and the solid particles comprise 55–80% by volume in the green state.

It has been found that it is difficult to have greater than 80% by volume of solid particles in the mixture due to difficulties in mixing and packing. Greater than 45% by volume of binder phase results in too much binder being present in the mixture, which can lead to the formation of large regions of binder phase containing little or no particulate matter. Upon carbonisation, these regions may form carbonised binder having little resistance to attack by alkali metal.

Figure 2:
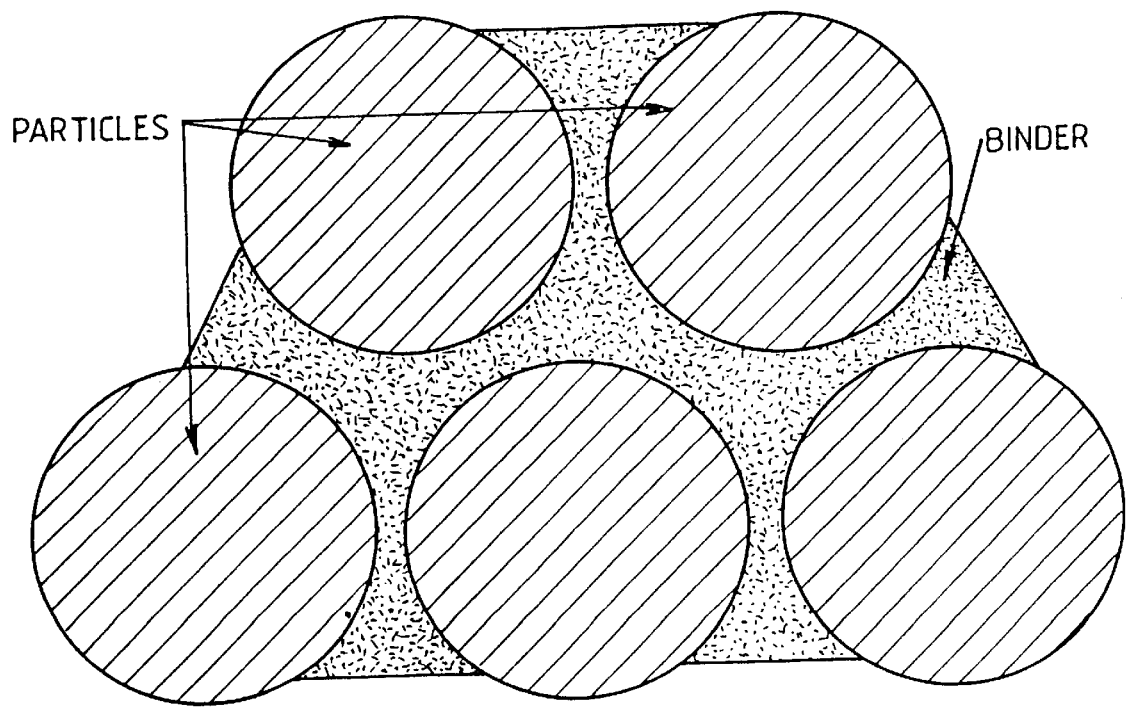
Figure 3:
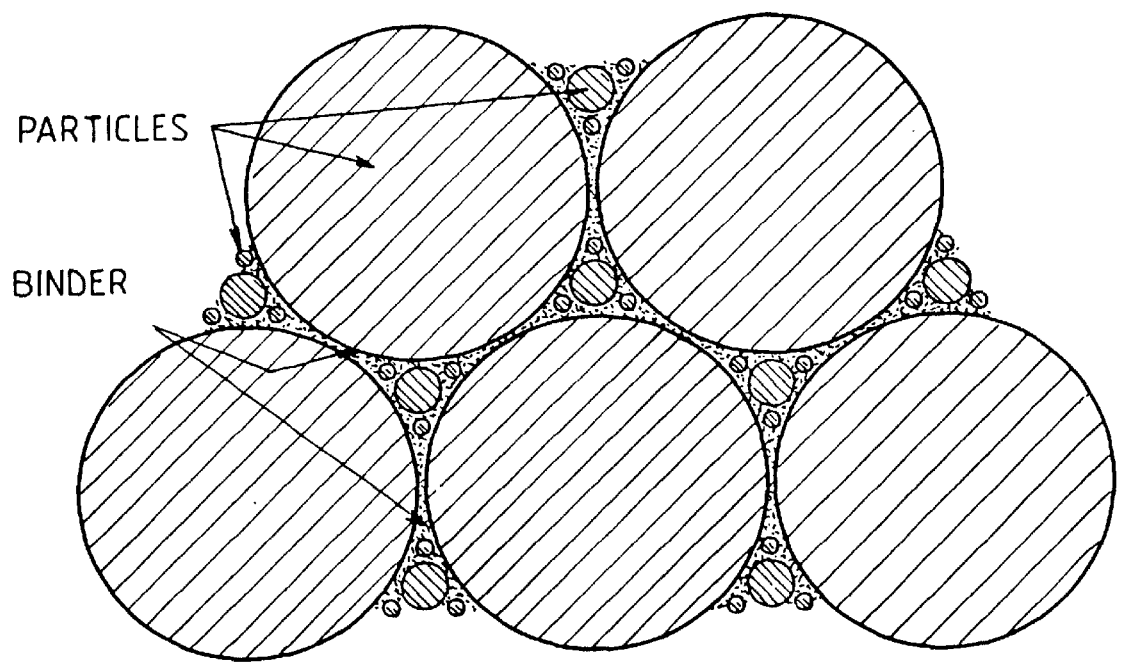

In order to demonstrate the required selection of granulometry and binder phase levels used in the present invention, reference is made to FIGS. 1 to 3, which show schematic representations of well-mixed composition according to the present invention. FIGS. 1 and 3 both have desired granulometry and binder levels. In these Figures, only small voids exist between particles and thin layers of binder surround and coat the particles. In contract, FIG. 2 is a representation of a composition having poor granulometry and excess binder phase. In FIG. 2, large pools of binder phase exist between the particles and the desired thin layer of binder phase coating each particle is not obtained. The system shown in FIG. 2 would not produce an ordered carbon upon pyrolysis at 800° C. to 1200° C.

Figure 4:
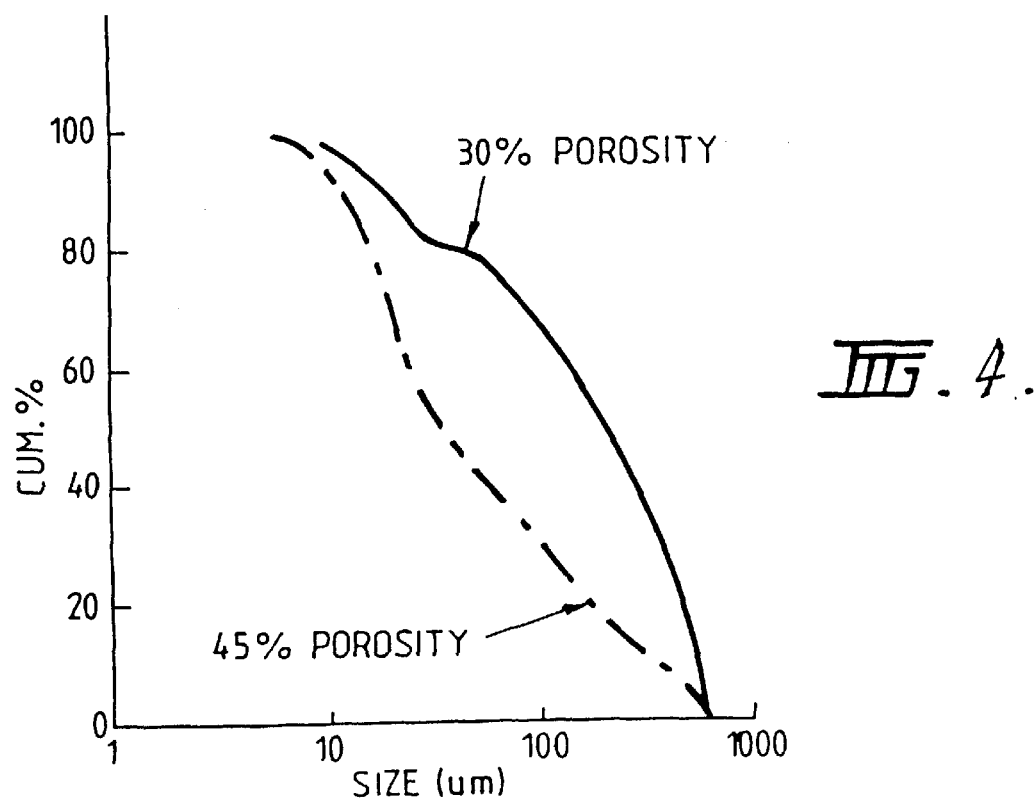

FIG. 4 is a plot showing the particle size distribution for particle mixture. The mixture represented by the solid line has relatively low porposity and would be suitable for use in the present invention. The mixture represented by the dotted lines has a porosity of 45% and would require larger amounts of binder.

A number of polymerisable resins may be suitable for use in the present invention. Resins that may be used include phenolics such as novolacs and resoles, polyphenylene, epoxy, polyamide, polyimide, furane, nitrile and alkyd resins. One or more polymerisable resins may be included in the binder phase.

The binder phase may also include one or more polymerisation promoters to enable a polymerisation and/or a crosslinking reaction to occur. The polymerisation promoter may simply act as an initiator for the reaction or it may take part in the polymerisation reaction as a reactant.

The binder phase may further comprise one or more solvents. The solvent(s) may be used to adjust the viscosity of the resin-based binder system. In some embodiments, the solvent also actively participates in and facilitates a polymerisation and/or cross-linking reaction with the resin.

The preferred binder phase of the present invention comprises a novolac resin, furfuryl alcohol and hexamine. Hexamine is also known as hexamethylene-tetramine. The furfuryl alcohol acts as a solvent and as a polymer precursor. The hexamine acts as a polymerisation promoter. In this binder system, the inventors have found that both the furfuryl alcohol and the hexamine take part in the reaction sequence that occurs during curing and pyrolysis and become incorporated into the final structure. In particular, nitrogen is retained in the structure through carbonisation and it is postulated that the retention of nitrogen is an important feature in further increasing the high Fermi level and alkali resistance of the carbon. The polymer may be capable of being involved in aromatic ring formation during pyrolysis. The retention of much of the nitrogen and some hydrogen in the material even after baking to 1100° C. is a non standard behaviour compared with pyrolysis of the individual components.

In the preferred novolac-based binder phase, preliminary work by the present inventors has suggested that the desired high Fermi level carbon is obtained from novolacs having free ortho positions and that the preferred novolac resin has sufficient of these sites available to give linkages and incorporate nitrogen in a form which is stable at higher temperatures.

In the preferred novolac/hexamine/furfuryl alcohol binder phase, the binder phase may comprise 20–60% novolac, with hexamine being added in proportion, normally being around 15–25% of the novolac (all percentages being weight percent, unless otherwise specified). Furfuryl alcohol makes up the balance. More preferably, the binder phase comprises 30–45% novolac, 6–9% hexamine and 46–64% furfuryl alcohol.

Other resins that may be suitable to give this further enhanced performance include heterocyclic resins or resins that can re-arrange to form new aromatic rings and particularly incorporate a hetero atom into an aromatic structure during polymerisation or carbonisation. Examples of these include polyamides, polyimides, furanes and nitrites.

Studies of the preferred novolac-furfuryl alcoholhexamine binder phase have shown that polyamides, polyimides and nitrites may be formed as intermediates during curing of the binder phase. Accordingly, polyamides, polyimides and nitriles may be used as original components in the binder phase. However, it is preferred to use appropriate compositions of novolac/furfuryl alcohol/hexamine to generate these compounds in-situ as the components of the novolac/furfuryl alcohol/hexamine system are lower in price than polyamides, polyimides and nitriles.

Polyamide resins are generally made from the reaction of a polybasic acid and a polyamide. Examples of suitable precursor materials that may be used to produce polyamide resins suitable for use in the present invention include acids such as terephthalic acid, isophthalic acid, pyromellitic acid, glutaric acid, adipic acid and pimelic acid, and amines selected from O-phenylene diamine, 2,4-diaminotoluene, 4,4 methylene dianiline, ethylene diamine, hexamethylene diamine and piperazine.

Examples of polyimide resins suitable for use in the present invention include polybenzimadazoles, poly(N,N'-bis (p,p'-oxydiphenylene)) pyromellitimide and poly(m-phenylene pyromellitimide).

Nitriles that can be used in the present invention include basic compounds such as acrylonitrile or benzylnitrile which can react to form polymeric species such as amides, or longer chain forms, such as polyacrylonitrile.

Examples of furane resins suitable for use in the present invention include poly(furfuryl alcohol) and its substituted derivatives and poly(2,5 bis(hydroxymethyl) furan and its substituted derivatives.

Examples of polyphenylene resins suitable for use in the present invention include polyphenylene, polyperfluorophenylene, polyphenylene oxide and polyphenylene sulfide. Substitution of the aromatic ring is possible and common using groups of which the following are examples: phenyl, methyl, epoxides, phenylsulphate and hydroxyl.

Examples of epoxy resins suitable for use in the present invention include those that are prepared by reacting resins selected from diglycidyl ether of bisphenol A and its derivatives, glycidyl ethers of cresol-novolac resins, glycidyl ethers of phenol-novolac resins and tetraglycidylmethylene dianiline and its derivatives with amines selected from ethylene diamine, propylene diamine, p-phenylene diamine, 2,4 diamino toluene and 4,4 methylene dianiline.

Alkyd resins suitable for use in the present invention may be prepared from the reaction of polyhydric alcohols and polybasic acids (or their anhydrides) modified with monobasic fatty acids. Examples of each of these materials are:

polyhydric alcohols—glycerol, pentaerythritol, sorbitol;

polybasic acids—phthalic acid, maleic acid, adipic acid, pyromellitic acid; and fatty acids—stearic acid, oleic acid, linoleic acid, palmitic acid.

It will be understood that the above list of resins is intended to exemplify polymerisible resins suitable for use in the present invention. It will be further understood that the present invention is not limited to the polymerisable resins specially recited above.

The type of solvent and polymerisation reaction used are dependent upon the resin system chosen and whether it is physically compatible with the solid particles and whether the resin requires a polymerisation promoter to initiate and/or take part in the polymerisation reaction.

Examples of polymerisation promoters suitable for use in the present invention include formaldehyde, trioxane, epoxides, urea formaldehyde, melamine formaldehyde, organic acids, such as p-toluene sulphonic acid, and phosphoric acid. Other polymerisation promoters compatible with the particular polymerisable resin used may also be utilised.

Other polymerisation promoters that may be used in the present invention are boron oxide ($B_2O_3$) or boric acid. These compounds are especially suitable for use in resin systems that include furfuryl alcohol. Not only does the boron oxide assist in promoting the polymerisation reaction, it is also postulated that the boron oxide acts to associate with edge carbon atoms in the carbonaceous structure formed following baking. This has the potential to improve the sodium resistance of the carbonaceous material formed after baking due to one or more of the following mechanisms:

(i) prevention of the formation of intercalation compounds. It is believed that sodium intercalation compounds are formed when sodium reacts with edge carbons in the carbonaceous structure. As the edge carbons are associated with the boron oxide there are no active sites available for the formation of sodium intercalation compounds.

(ii) another theory on sodium swelling has proposed that swelling is due to micro-condensation of sodium in the pores of carbonaceous material. The presence of $B_2O_3$ in the original resin mixture will result in boron oxide filling the pores and thereby preventing micro-condensation of sodium.

The binder phase may be polymerised by any suitable method known to those skilled in the art. For example, the binder phase may be polymerised by heating to an elevated temperature, by addition of chemicals such as polymerising agents or by a combination of both. Heating to an elevated temperature is the preferred method of polymerising the binder phase.

The binder phase should have a char yield upon carbonisation of at least 20%. If the char yield is significantly lower than 20%, the final product may have poor structural integrity, high porosity and low density. Preferably, the char yield is greater than 25%. The char yield is calculated according to the following equation:

$$\frac{\text{baked mass binder phase}}{\text{green mass binder phase}} \times 100\%$$

The composition of the present invention is particularly suitable for preparing carbon-containing materials. In a further aspect, the present invention provides a method for preparing a carbon-containing material, which method comprises:

1) mixing particles of solid material with a binder phase comprising at least one polymerisable resin and optionally one or more components selected from at least one polymerisation promoter and at least one solvent, said particles being wetted by said binder phase, one or more of the physical properties of the resulting mixture being controlled such that said particles become coated with a thin layer of said binder phase, 2) curing said binder phase to at least partially polymerise said binder phase, and 3) heating the cured mixture to a temperature in the range of 800° C. to 1200° C. to carbonise said binder phase to produce a carbon-based material which exhibits resistance to disruption by alkali metals.

The process may further comprise shaping the mixture obtained by step (1) into a desired shape prior to curing.

Preferably, the one or more of the physical properties of the composition that are controlled such that thorough mixing of the particles and binder phase causes the particles to become coated with a thin layer of the binder phase include the relative amounts of said particles and said binder phase, the viscosity of the binder phase and the granulometry of the particles.

Preferably, the binder phase is cured by heating the mixture obtained in step (1) to an elevated temperature.

The preferred form of the process involves mixing the binder phase components of polymerisable resin and optional crosslinking agent(s) and solvent(s). The amount of solvent and/or temperature of the binder phase are controlled to achieve the desired viscosity (preferably less than 10 Pa.s) and the solid particles are then added. Typically, the solid particles are a bimodal or trimodal mixture to achieve the desired granulometry and to obtain the desired packing density. Alternatively, a continuous distribution of particle sizes may be used. Ideally, the voids between particles are preferably less than 20 $\mu$m in diameter and more preferably less than 15 $\mu$m in diameter, most preferably less than 5 $\mu$m.

Typically (and preferably), the mixture of binder phase and particles will comprise 20–45% by volume of binder phase, which includes very fine filler particles. This amount of binder phase will wet the solid particles and fill the small voids between particles. Using the preferred particle sizes, this gives a surface layer of binder phase coating each particle of a thickness of 2 $\mu$m or less.

The mixture is preferably subsequently heated to an elevated temperature to polymerise the binder phase around the particles. The temperature used in this curing step is dependent upon the properties of the particular resin used in the binder phase, with temperatures in the range of 100°–200° C. being typical. The curing step causes at least partial polymerisation of the binder phase and results in the formation of a strong structure that may be described as a polymeric matrix in intimate contact with and holding the solid particles. It is preferred that curing results in the formation of a polymerisation product that includes at least areas of ordered polymer. Unreacted materials are typically driven off as volatiles and this stage must be closely controlled to avoid disrupting the structure. For the preferred novolac system, this may take 30 hours at a temperature of 200° C.

After curing, the material is carbonised by heating at a reasonably slow rate to a temperature in the range of 800°–1200° C., preferably 900°–1100° C. An appropriate slow rate of temperature increase is used because volatiles need to be released or oxide atoms and unlinked hydrocarbons and aromatics are lost.

The carbonised article may then be used.

During baking, it may be necessary to protect the material from oxidation, particularly if the particulate material is not oxygen resistant. This may also be necessary when the material is to be used in an application where alkali metals are present, as oxidation can decrease the Fermi level of the material and render it prone to alkali attack.

The composition and method of the present invention are particularly suitable for manufacturing articles and artefacts. The green mixture of particles and binder phase should have sufficient strength to be self-supporting and enable easy handling prior to curing. Additionally, the system does not pass through a liquid phase during curing and baking and hence improved dimensional stability may be obtained during baking. Furthermore, articles and objects made in accordance with the invention have a closed porosity and a low total porosity, which may be of the order of 15–20%. The final material also has a fine porosity, with pore size generally being less than 1 $\mu$m.

The composition and method of the present invention are particularly useful for producing cathodes for use in aluminium electrolysis cells. The solid particles are preferably graphite and/or anthracite if the cathode is to be used in a conventional cell. For drained cathode cells, which require a cathode that is wetted by molten aluminium, the solid particulate material used in the composition and method preferably includes a refractory hard material, more preferably titanium diboride.

Articles produced according to the invention also exhibit good strength, with a flexural strength in the range of 5–10 MPa being typical. This is similar to the strength of conventional aluminium cathode carbons.

The resin-based system also can give stronger bonding from lower thickness and better penetration of porous filler particles than can be achieved with pitch. This is due to the ability to use functional groups on the resins to promote wetting of fillers and also being able to control rheology to give desired thicknesses. The surface chemistry of the solid particles can also be controlled to match the binder component properties. These may allow the surface of the solid particles to provide hetero atoms to actually take part in the reactions and/or to selectively attach to parts of the binder components to promote ordering in the initial uncured state which assists in forming the desired final structure. For example, in the preferred novolac/hexamine/furfuryl alcohol system, the promotion of oxides on the surface of the solid particles has been found to improve wetting and spreading.

The resin-based system of the present invention allows these advantages to be realised, whilst also incorporating resistance to disruption of the carbon structure by alkali metals, especially sodium. This has not been achieved before.

In a further aspect, the present invention provides an article manufactured from a mixture comprising solid particles and a binder phase including polymerisable resin and optionally a polymerisation promoter and/or a solvent, said mixture being cured and carbonised by heating to a temperature in the range of 800°–1200° C. to produce a carbonaceous matrix holding said solid particles, said carbonaceous matrix being resistant to disruption by alkali metals.

As mentioned above, it has been postulated that the presence of retained nitrogen in the system during and after baking perhaps assists in improving the resistance to sodium disruption. In a further still aspect, the present invention provides a resin binder system suitable for use in preparing carbon-containing materials exhibiting resistance to disruption by alkali metals, characterised in that nitrogen is retained in said material following baking at temperatures of from 800° C. to about 1200° C.

In another aspect, the present invention provides a carbon-containing material produced from a resin binder system and particulate carbonaceous material wherein said carbon-based material has a Fermi level sufficiently high to resist disruption by sodium. The article may be a cathode for use in an electrolysis cell for aluminium production.

Tests carried out on a range of carbon-based materials according to the present invention have all shown excellent resistance to physical disruption by sodium attack.

The carbon-containing material of the present invention is particularly suitable for use in the cathode structure of aluminium smelting cells.

Resin/polymer systems can offer substantial advantages in physical and electrical properties, provided their lack of chemical resistance can be overcome. The present invention has achieved this. There are also significant environmental advantages to using a resin/polymer based system compared to pitch-based systems. (Pitch is comprised of polyaromatic hydrocarbons, is variable in composition, and contains carcinogenic agents). With resin based systems, the chemistry can be controlled, the components are known and standard technology exists for handling and disposing of them. A suitable resin system may also be applicable in the development of advanced smelting technologies currently restricted by the unavailability of materials.

The present invention has largely overcome the problems of resistance to sodium disruption of resin-based systems in aluminium smelting cells and allows the above-mentioned advantages to accrue. Further advantages arising from use of the present invention in the cathodes structure of aluminium cells may include:

Substitution of the material used to make cathodes for the aluminium reduction process (conventional cell technology) that should lead to longer cell life (reduction in cost and increase in throughput through reduced downtime) and to reduced voltage drop in the cell.

Production of net shape cathode blocks through avoidance of liquid phase pyrolysis as occurs in pitch based technology. The liquid phase leads to dimensional instability.

Production of high quality cathode blocks without the need for firing at above 1600° C. The resin systems give good conductivity and strength at much lower temperature than pitch.

As a further advantage arising from the present invention, it is possible to add further additives to the composition to enable the attainment of desired properties in the final product. The ability to bake at lower temperature and still form a high quality product can enable additives which are volatile at higher temperatures to be used in contrast to the situation for highly graphitised, pitch-based systems which require higher temperature baking.

If these further additives are to be included in the composition of the present invention, it will be most convenient for these additives to form a part of the solid particulate material added to the composition. It will be appreciated that the additives should meet the requirement of being wetted by the binder phase. Furthermore, the additive particles should have a granulometry that allows formation of the thin layer of binder and minimises the formation of large voids.

Articles produced in accordance with the invention may also be used in many other fields. For example, refractory bricks and refractory linings may be produced by using solid particles of oxide materials. Ceramics may also be made by using solid ceramic particles in the system. Use of refractory hard materials, such as $TiB_2$, may allow the production of aluminium wettable cathodes for use in aluminium smelting.

The product can be used to make stand-alone artefacts such as electrodes (cathodes and anodes), refractories and the like. Alternatively, the product can be bonded to a substrate either during fabrication or afterwards to give laminated structures. In any fabrication the artefact does not need to have uniform composition of solid particles and these may be graded to change properties over the dimensions or thickness of the article.

EXAMPLE 1

In an experiment designed to study the mechanism by which sodium resistant carbon is formed 92 parts of non-carbonaceous filler material ($TiB_2$) was mixed with 8 parts of novolac-furfuryl alcohol resin in which 4–12 wt % hexamine was dissolved. This mixture contained approximately 80% by volume solids and 20% by volume binder phase. This mixture was thoroughly mixed, pressed, and cured according to procedures known to those skilled in the art and baked to 1000° C. The chemical composition and structure of this binder carbon was determined. The chemical composition of the binder carbon was found to be 95–97% C, 1–1.5% H, 1.5–3% N, and balance oxygen. Over 20% of the nitrogen added initially in the hexamine was retained in the baked object. Structural studies using X-Ray diffraction detected the presence of highly ordered carbon having $d_{002}$ lattice spacing of 3.351 Å and $L_c$ value >400 Å. This is very close to perfect graphite. The same experiment was carried out using the same resin but without addition of any solid particles. The chemical composition of the binder carbon was the same, but the binder carbon had $d_{002}$ lattice spacing of 3.54 Å and $L_c$ of 13 Å.

EXAMPLE 2

In a similar experiment to the above, 91 parts of non-carbonaceous filler material ($TiB_2$) was mixed with 9 parts of an aqueous resole (80%) solution. This mixture was thoroughly mixed, pressed and cured according to procedures known to be skilled in the art and baked to 1000° C. The structure of the binder carbon was examined by X-Ray diffraction and the presence of an ordered carbon with $d_{002}$ lattice spacing of 3.351 A and an $L_c$ value >400 was detected. was detected.

EXAMPLE 3

In a similar experiment to the above, 92 parts of non-carbonaceous filler material ($TiB_2$) was mixed with 8 parts of a cyanate ester resin. This mixture was thoroughly mixed, pressed and cured according to procedures known to be skilled in the art and baked to 1000° C. The structure of the binder carbon was examined by X-Ray diffraction and the presence of an ordered carbon with d002 lattice spacing of 3.351 A and an $L_c$ value >300 was detected.

EXAMPLE 4

In a similar experiment to the above, 92.5 parts of non-carbonaceous filler material ($TiB_2$) was mixed with 7.5 parts of a two part epoxy resin consisting of 10 parts resin and 3 parts hardener. This mixture was thoroughly mixed, pressed and cured according to procedures known to be skilled in the art and baked to 1000° C. The structure of the binder carbon was examined by X-Ray diffraction and the presence of an ordered carbon with $d_{002}$ lattice spacing of 3.351 A and an $L_c$ value >420

EXAMPLE 5

In an experiment designed to examine the alkali resistance of the binder carbon 74 parts of carbonaceous filler material (graphite) was mixed with 26 parts of novolac furfuryl alcohol resin in which 4–12 wt % hexamine was dissolved. This mixture was thoroughly mixed, pressed and cured according to procedures known to be skilled in the art and baked to 1000° C. The resistance of the binder carbon was examined by use of a standard Rappaport test. The swelling of the rest specimen was determined to be of the order 0.02% which is very similar to the expansion of fully graphitised materials used in aluminium production. Such materials are used specifically because of their very low expansion properties.

EXAMPLE 6

In an experiment designed to examine the alkali resistance of the binder carbon 74 parts of carbonaceous filler material (graphite) was mixed with 26 parts of an aqueous resole (80%) solution. This mixture was thoroughly mixed, pressed and cured according to procedures known to be skilled in the art and baked to 1000° C. The resistance of the binder carbon was examined by use of a standard Rappaport test. The swelling of the test specimen, as shown in FIG. 5 was determined to be of the order of 0.14% which is significantly larger than the expansion of the preferred embodiment of the invention but could still be usable in many applications and is better than that typically obtained for the lower temperature baking of pitch bonded cathodes.

Since modifications within the spirit and scope of the invention may be readily effected by persons skilled in the art, it is to be understood that the invention is not limited to the particular embodiment described, by way of example, hereinabove.

We claim:

1. A composition suitable for the preparation of a carbon-containing material resistant to alkali metal disruption, said composition comprising a mixture of:
   (a) a binder phase, having a viscosity of less than 10 Pascal seconds and a char yield in excess of 20% upon heating to a temperature in a range of 800° C.–1,200° C., and comprising at least one polymerizable resin, the viscosity being determined in the absence of any very fine filler particles in the binder phase, and
   (b) particles of solid material, which material is thermally stable at a temperature in a range of 800° C.–1,200° C., said particles having a granulometry wherein void spaces between the particles have a size of less than 20 µm in diameter,
   wherein in said mixture, said particles are coated with a layer of said binder phase having a thickness of less than 2 µm,
   and wherein when said composition is carbonized by heating to a temperature in a range of 800° C.–1,200° C., said composition forms a carbon-containing material resistant to alkali metal disruption.

2. The composition of claim 1, wherein the binder phase further comprises one or more components selected from the group consisting of at least one polymerization promoter and at least one solvent.

3. The composition as claimed in claim 1, wherein the viscosity of the binder phase is less than 1.0 Pascal seconds.

4. The composition as claimed in claim 1, wherein the viscosity of the binder phase is from 0.1 to 0.5 Pascal seconds.

5. The composition as claimed in claim 1, wherein said binder phase comprises 20–45% by volume of said composition and said solid particles comprise 55–80% by volume of said composition.

6. The composition as claimed in claim 1, wherein said particles have a size between 5 µm and 2,000 µm.

7. The composition as claimed in claim 6, wherein said particles comprise a mix of particles selected from the group consisting of a bimodal mix of particles, a trimodal mix of particles and a controlled mix of particles having a continuous size distribution.

8. The composition as claimed in claim 6, further comprising very fine particles having a size within a range of 30–500 nm.

9. The composition as claimed in claim 1, wherein the thickness of said layer of said binder phase is less than 1 µm.

10. The composition as claimed in claim 1, wherein the thickness of said layer of said binder phase is less than 0.5 µm.

11. The composition as claimed in claim 1, wherein the solid material is at least one member selected from the group consisting of coke, anthracite, graphite, a ceramic material, a refractory hard material, and a high-melting point metal.

12. The composition as claimed in claim 1, wherein the at least one polymerizable resin is selected from the group consisting of a phenolic resin, a polyamide resin, a polyimide resin, a furane resin, a nitrile resin, an epoxy resin, a polyphenylene resin, a heterocyclic resin and an alkyd resin.

13. The composition as claimed in claim 12, wherein the at least one polymerizable resin is a polyamide resin prepared by a reaction of at least one polybasic acid made from at least one member selected from the group consisting of terephthalic acid, isophthalic acid, pyromellitic acid, glutaric acid, adipic acid and pimelic acid, and at least one polyamine prepared from at least one precursor selected from the group consisting of O-phenylene diamine, 2,4-diaminotoluene, 4,4-methylene dianiline, ethylene diamine, hexamethylene diamine and piperazine.

14. The composition as claimed in claim 12, wherein the at least one polymerizable resin is a polyimide resin selected from the group consisting of polybenzimadazoles, poly(N, N'-bis(p,p'-oxydiphenylene) pyromellitimide and poly(m-phenylene pyromellitimide).

15. The composition as claimed in claim 12, wherein the at least one polymerizable resin is a furane resin selected from the group consisting of poly(furfuryl alcohol) and poly(2,5 bis(hydroxymethyl)) furan.

16. The composition as claimed in claim 12, wherein said at least one polymerizable resin is a polyphenylene resin selected from the group consisting of polyphenylene, polyperfluorophenylene, polyphenylene oxide and polyphenylene sulfide, wherein the aromatic ring is unsubstituted or substituted by at least one group selected from the group consisting of phenyl, methyl, epoxides, phenylsulphate and hydroxyl.

17. The composition as claimed in claim 12, wherein the at least one polymerizable resin is an epoxy resin selected from those that are prepared by reacting resins selected from the group consisting of diglycidyl ether of bisphenol A, glycidyl ethers of cresol-novolac resins, glycidyl ethers of phenol-novae resins and tetroglycidylmethylene dianiline with amines selected from the group consisting of ethylene diamine, propylene diamine, p-phenylene diamine, 2,4 diamino toluene and 4,4 methylene dianiline.

18. The composition as claimed in claim 12, wherein the at least one polymerizable resin is an alkyd resin prepared from the reaction of polyhydric alcohols and polybasic acids, or their anhydrides, modified with a monobasic fatty acid, wherein said polyhydric alcohol is selected from the group consisting of glycerol, pentaerythritol and sorbitol, wherein said polybasic acid is selected from the group consisting of phthalic acid, maleic acid, adipic acid and pyromellitic acid and said fatty acid is selected from the group consisting of stearic acid, oleic acid, linoleic acid and palmitic acid.

19. The composition as claimed in claim 12, wherein the at least one polymerizable resin is a novolac resin, and the binder phase further comprises furfuryl alcohol and hexamethylenetetramine.

20. The composition as claimed in claim 19, wherein the binder phase comprises 20–60% novolac, 15–25% hexamethylenetetramine, and 15–65% furfuryl alcohol.

21. The composition as claimed in claim 19, wherein the binder phase comprises 30–50% novolac, 6–10% hexamethylenetetramine, and 50–64% furfuryl alcohol.

22. The composition as claimed in claim 19, wherein the binder phase comprises 40.2% novolac, 8.6% hexamethylenetetramine and 51.2% furfuryl alcohol.

23. The composition as claimed in claim 1, wherein the binder phase includes a component that contains electron donor atoms and the carbon-containing material contains the electron donor atoms incorporated therein.

24. The composition as claimed in claim 23, wherein said electron donor atoms are nitrogen atoms.

25. A composition as claimed in claim 1, wherein said binder phase comprises less than 45% by volume of said composition.

26. A method for preparing a carbon-containing material resistant to alkali metal disruption, comprising:

(a) mixing a binder phase having a viscosity of less than 10 Pascal seconds and a char yield in excess of 20% upon heating to a temperature in a range of 800° C.–1,200° C., and comprising at least one polymerizable resin, the viscosity being determined in the absence of any very fine filler particles in the binder phase, and particles of solid material, which material is thermally stable at a temperature in a range of 800° C.–1,200° C., said particles having a granulometry wherein void spaces between the particles have a size of less than 20 µm in diameter, to form a mixture, wherein in said mixture, said particles are coated with a layer of said binding phase having a thickness of less than 2 µm, (b) curing said binder phase to produce a cured mixture, and (c) heating the cured mixture to a temperature in a range of 800° C.–1,200° C. to carbonize said binder phase to produce a carbon-containing material resistant to alkali metal disruption.

27. A method as claimed in claim 26, further comprising shaping the mixture obtained in step (a) into a shape prior to said curing step (b).

28. A method as claimed in claim 26, wherein said binder phase is cured by heating.

29. A method as claimed in claim 26, wherein said viscosity is less than 1.0 Pascal seconds.

30. A method as claimed in claim 26, wherein said viscosity is from 0.1 to 0.5 Pascal seconds.

31. A method as claimed in claim 26, wherein said binder phase comprises 20–45% by volume of said mixture and said particles comprise 55–80% by volume of said mixture.

32. A method as claimed in claim 26, wherein said particles have a size of about 5 μm to 2,000 μm.

33. A method as claimed in claim 32, wherein said mixture further comprises very fine particles having a size within a range of 30 to 500 nm.

34. A method as claimed in claim 32, wherein said particles comprise a mix of particles selected from the group consisting of a bimodal mix of particles, a trimodal mix of particles and a controlled mix of particles having a continuous size distribution.

35. A method as claimed in claim 26, wherein said thin layer of binder phase has a thickness of less than 1.0 μm.

36. A method as claimed in claim 26, wherein said thin layer of binder phase has a thickness of less than 0.5 μm.

37. A method as claimed in claim 26, wherein said solid material is at least one member selected from the group consisting of coke, anthracite, graphite, a ceramic material, a refractory hard material and a high melting point metal.

38. A method as claimed in claim 26, wherein said solid particles have an initial wettability, and the method further comprises treating the solid particles to improve the initial wettability of the solid particles by the binder phase in step (a).

39. A method as claimed in claim 26, wherein the at least one polymerizable resin is selected from the group consisting of a phenolic resin, a polyamide resin, a polyimide resin, a furane resin, a nitrile resin, an epoxy resin, a polyphenylene resin, a heterocyclic resin and an alkyd resin.

40. A method as claimed in claim 39, wherein the at least one polymerizable resin is a novolac resin and said binder phase further includes furfuryl alcohol and hexamethylenetetramine.

41. A method as claimed in claim 40, wherein the binder phase comprises 20–60% novalac, 15–25% hexamethylenetetramine and 15–65% furfuryl alcohol.

42. A method as claimed in claim 40, wherein the binder phase comprises 30–50% novolac, 6–10% hexamethylenetetramine and 50–64% furfuryl alcohol.

43. A method as claimed in claim 42, wherein the binder phase comprises 40.2% novolac, 8.6% hexamethylenetetramine and 51.2% furfuryl alcohol.

44. A method as claimed in claim 26, wherein the binder phase includes a component that contains electron donor atoms and the carbon-containing material produced in step (c) contains the electron donor atoms incorporated therein.

45. A method as claimed in claim 44, wherein said electron donor atoms are nitrogen atoms.

46. A method as claimed in claim 26, wherein said mixture is cured by heating to 100°–200° C.

47. A method as claimed in claim 26, further comprising protecting the cured mixture from oxidation during said heating step (c).

48. A method as claimed in claim 26, wherein said binder phase comprises less than 45% by volume of said composition.

49. A method for preparing a carbon-containing material resistant to alkali metal disruption, comprising:
(a) mixing a binder phase having a viscosity of less than 10 Pascal seconds and a char yield in excess of 20% upon heating to a temperature in a range of 800° C. to 1,200° C. and comprising at least one polymerizable resin having heteroatoms incorporated therein upon polymerization, the viscosity being determined in the absence of any very fine filler particles in the binder phase, and particles of solid material, which material is thermally stable at a temperature in a range of 800° C.–1,200° C., said particles having a granulometry wherein void spaces between the particles have a size of less than 20 μm in diameter to produce a mixture, wherein in said mixture, said particles are coated with a layer of said binder phase having a thickness of less than 2 μm,
(b) curing said binder phase to at least partially polymerize said binder phase, to produce a cured mixture, and
(c) heating the cured mixture to a temperature in a range of 800° C.–1,200° C. to carbonize said binder phase to produce a carbon-containing material resistant to alkali metal disruption.

50. A method as claimed in claim 49, wherein the cured mixture contains a primary polymer chain backbone which undergoes dehydrogenation during heating essentially without disruption of the backbone.

51. A method as claimed in claim 49, wherein said heteroatoms are nitrogen atoms.

52. A method as claimed in claim 49, wherein said heteroatoms are oxygen atoms.

53. A method as claimed in claim 49, wherein said mixture is shaped to a shape prior to said curing step (b).

54. A method as claimed in claim 49, wherein said binder phase is cured by heating.

55. A method as claimed in claim 49, wherein said viscosity is from 0.1 to 0.5 Pascal seconds.

56. A method as claimed in claim 49, wherein said binder phase comprises 20–45% by volume of said mixture and said particles comprise 55–80% by volume of said mixture.

57. A method as claimed in claim 49, wherein said particles have a size of about 5 μm to 2,000 μm.

58. A method as claimed in claim 57, wherein said mixture further comprises very fine particles having a size within a range of 30 to 500 nm.

59. A method as claimed in claim 57, wherein said particles comprise a mix of particles selected from the group consisting of a bimodal mix of particles, a trimodal mix of particles and a controlled mix of particles having a continuous size distribution.

60. A method as claimed in claim 49, wherein said solid material is at least one member selected from the group consisting of coke, anthracite, graphite, a ceramic material, a refractory hard material and a high melting point metal.

61. A method as claimed in claim 49, wherein the at least one polymerizable resin is selected from the group consisting of a novolac resin, a polyamide resin, a polyimide resin, a nitrile resin, a furan resin and a heterocyclic resin.

62. A method as claimed in claim 49, wherein the binder phase includes a component that contains electron donor atoms and the carbon-containing material produced in step (c) contains the electron donor atoms incorporated therein.

63. A method as claimed in claim 62, wherein the electron donor atoms are nitrogen atoms.

64. A method as claimed in claim 49, wherein said binder phase comprises less than 45% by volume of said composition.

65. A composition suitable for the preparation of a carbon-containing material resistant to alkali metal disruption, said composition comprising a mixture of:
(a) a binder phase having a viscosity of less than 10 Pascal seconds and a char yield in excess of 20% upon heating to a temperature in a range of 800° C.–1,200° C., and comprising at least one polymerizable resin having heteroatoms incorporated therein upon polymerization, the viscosity being determined in the absence of any very fine filler particles in the binder phase, and (b) particles of solid material, which material is thermally stable at a temperature in a range of 800° C.–1,200° C., said particles having a granulometry wherein said void spaces between the particles have a size of less than 20 $\mu$m in diameter wherein in said mixture, said particles are coated with a layer of said binder phase having a thickness of less than 2 $\mu$m, and wherein when said composition is carbonized by heating to a temperature in a range of 800° C.–1,200° C., said composition forms a carbon-containing material resisting to alkali metal disruption.

66. The composition of claim 65, wherein the binder phase further comprises one or more components selected from the group consisting of at least one polymerization promoter and at least one solvent.

67. The composition as claimed in claim 65, wherein said binder phase comprises 20–45% by volume of said composition and said particles comprise 55–80% by volume of said composition.

68. The composition as claimed in claim 65, wherein said particles have a size between 5 $\mu$m and 2,000 $\mu$m.

69. The composition as claimed in claim 65, wherein said particles comprise a mix of particles selected from the group consisting of a bimodal mix of particles, a trimodal mix of particles and a controlled mix of particles having a continuous size distribution.

70. The composition as claimed in claim 65, wherein said solid material is at least one member selected from the group consisting of coke, anthracite, graphite, a ceramic material, a refractory hard material and a high melting point metal.

71. A composition as claimed in claim 65, wherein said binder phase comprises less than 45% by volume of said composition.

* * * * *